July 16, 1957   H. C. J. LOWMAN ET AL   2,799,739
METHOD AND MEANS FOR IDENTIFYING CONDUCTOR PAIRS
Filed April 17, 1956   5 Sheets-Sheet 4

INVENTORS
H. C. J. LOWMAN
E. M. MURPHY
J. C. MUSGRAVE, JR.
M. L. SOMERS

BY
ATTORNEY

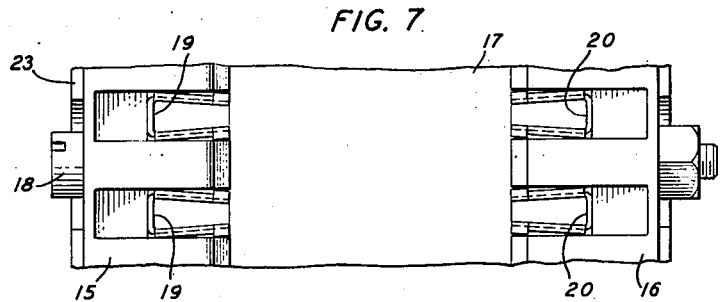
FIG. 7
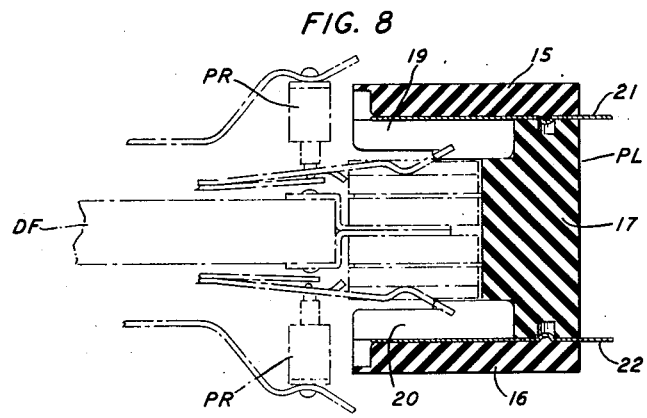
FIG. 8
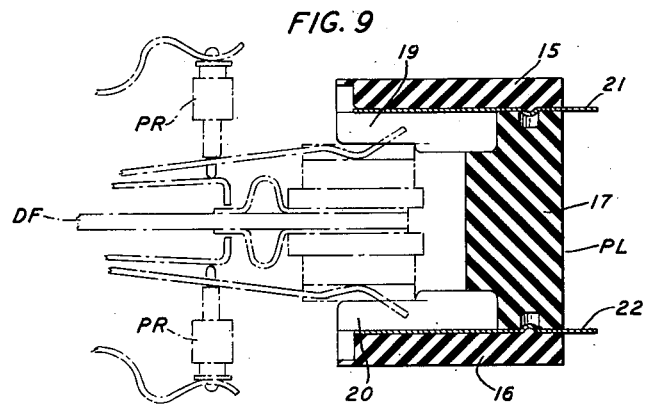
FIG. 9
INVENTORS H. C. J. LOWMAN
E. M. MURPHY
J. C. MUSGRAVE, JR.
M. L. SOMERS
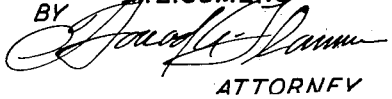
ATTORNEY

United States Patent Office 2,799,739
Patented July 16, 1957

2,799,739
METHOD AND MEANS FOR IDENTIFYING CONDUCTOR PAIRS

Henry C. J. Lowman, Edward M. Murphy, John C. Musgrave, and Melvin L. Somers, Boise, Idaho, assignors to American Telephone and Telegraph Company, a corporation of New York Application April 17, 1956, Serial No. 578,747

10 Claims. (Cl. 179—175.25)

This invention relates to a method and means for identifying and selecting conductor pairs in a multi-conductor cable, the ends of which terminate at locations remote from each other, and more particularly to automatic means operable by a single person which selects and applies tone to a conductor pair in the cable whereby the conductor pair may be readily identified and connected to its respective terminal or to a corresponding conductor pair in another cable.

The installation and connection of multi-conductor cable, and in particular telephone cable, usually involves the use of a cable having a relatively small number of conductor pairs in a single group or bundle or a large number of pairs divided into several groups or bundles. These conductor pairs, either in groups or in bundles, are usually confined in a common sheath or covering which may be of lead or some other suitable sheathing material. It is essential that the conductor pairs, in these groups which make up the cable, be connected to their proper terminals at each termination of the cable and to the corresponding conductor pairs of another cable.

It is particularly important that the conductor pairs in each cable length be properly identified and selected so that they may be spliced together to provide a long continuous length of cable wherein the conductor pairs at one termination may be expeditiously connected to their respective terminals at the other end.

In one method of identifying conductor pairs in multi-conductor cable which is in common usage today, the services of at least two workmen are required, viz, a splicer and a splicer's helper. The splicer is located at one end of the cable and the helper at the other. After a suitable pair of conductors, usually an odd pair, have been selected by the helper, he places a tone thereon, by any suitable means, whereby the splicer at the other end of the cable, by means of a probe, amplifier, and suitable receiver, is able to pick up and identify this conductor pair and connect thereto suitable equipment for conversing with his helper.

The next step is the identification and selection of the individual conductors in the cable. This is done by the helper informing the splicer over the talking pair of the number of the pair to which he is applying tone. The splicer, after receiving this information from his helper, probes among the conductors at his end of the cable until he picks up the tone on the receiver. The splicer, upon picking up the tone, knows that this is the cable pair the number of which was transmitted to him over the talking pair. This operation is repeated until all the conductors in the cable have been identified and tagged by the splicer.

It is obvious that this method of identifying conductor pairs in a multi-conductor cable is a long and tedious one and requires the services of two men.

In the method and means for identifying conductor pairs in a multi-conductor cable in accordance with our invention, we enable the splicer alone to properly identify, select and tag the conductor pairs without assistance.

In accordance with our invention, an automatic selecting device operated and under the control of the splicer at a remote point is provided. The splicer at the remote point, without the services of any other person, is able to effect the operation of the selection equipment to place tone on any selected conductor pair in the cable. In this manner the splicer in the field, having identified the conductor pair having the tone signal impressed thereon, is immediately aware that this is the particular conductor pair selected and the numerical identification of that conductor pair at the cable terminal.

Our invention permits the identification of conductor pairs in multi-conductor cables to be carried out rapidly and expeditiously in such a manner that the chances of an error in identification are reduced to a minimum, if not practically eliminated.

One object of our invention is the provision of method and means whereby the corresponding ends of conductor pairs in a multi-conductor cable may be correctly and expeditiously identified and selected by a single person working from one end of a working or non-working cable.

Another object of the invention is the provision of a method and means for identifying conductor pairs in a multi-conductor cable, whereby the conductor pairs are selected and tone placed thereon automatically by means at one location which is under control of a single person at a remote location.

Other objects and advantages of the present invention will be readily apparent from the following detailed description when read in connection with the accompanying drawings, in which:

Fig. 7 is an enlarged fragmentary view taken on line 7—7 of Fig. 6;

Fig. 8 is a view similar to Fig. 5 and illustrates the plug making contact with one type of main frame protector; and Fig. 9 is a view similar to Fig. 8 and illustrates the plug making contact with a different type of main frame protector.

Figure 1:
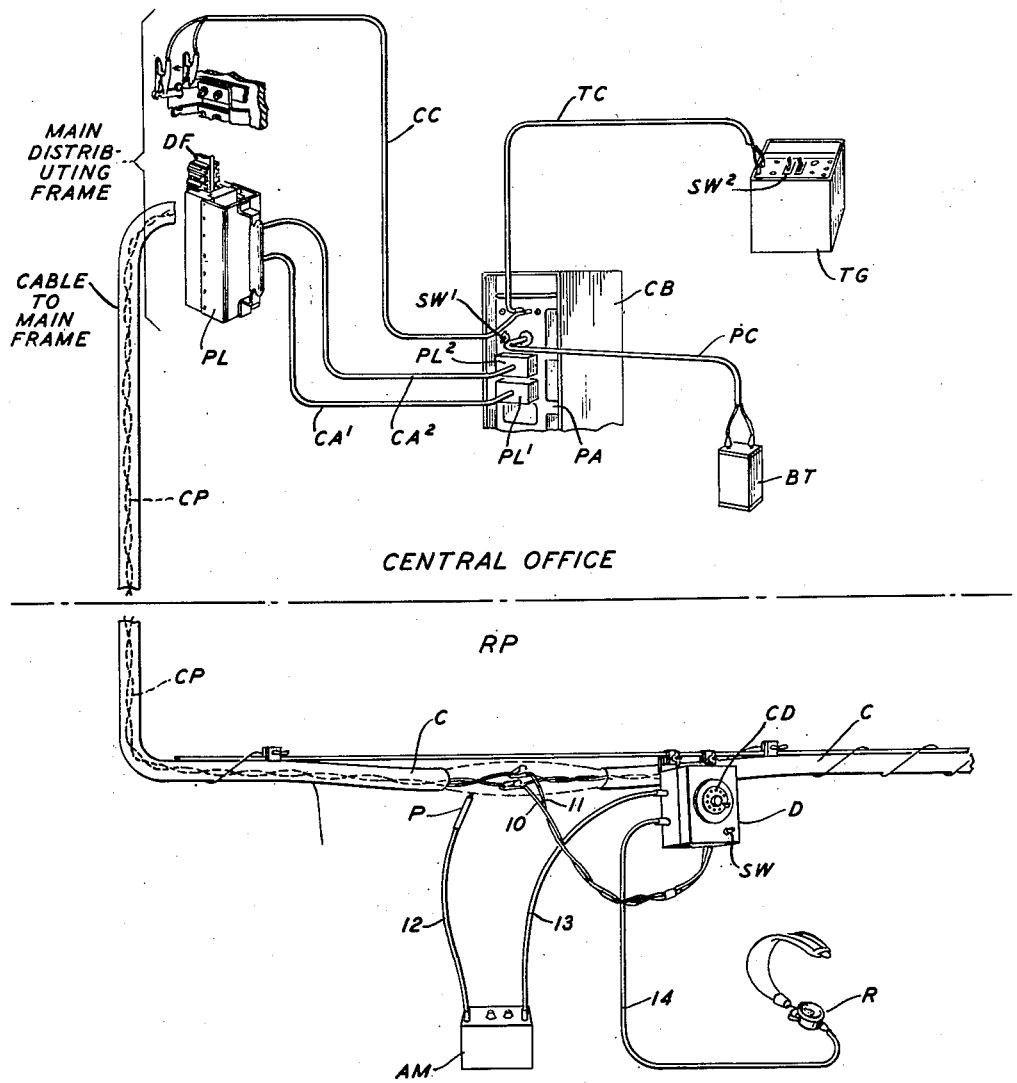
Fig. 1 is a view, partly in perspective, illustrating the components located at the central office with a fragment of a main distributing frame, the components located at the remote point, connected into a cable splice and the interconnection thereof over a multi-conductor cable.
Figure 2:
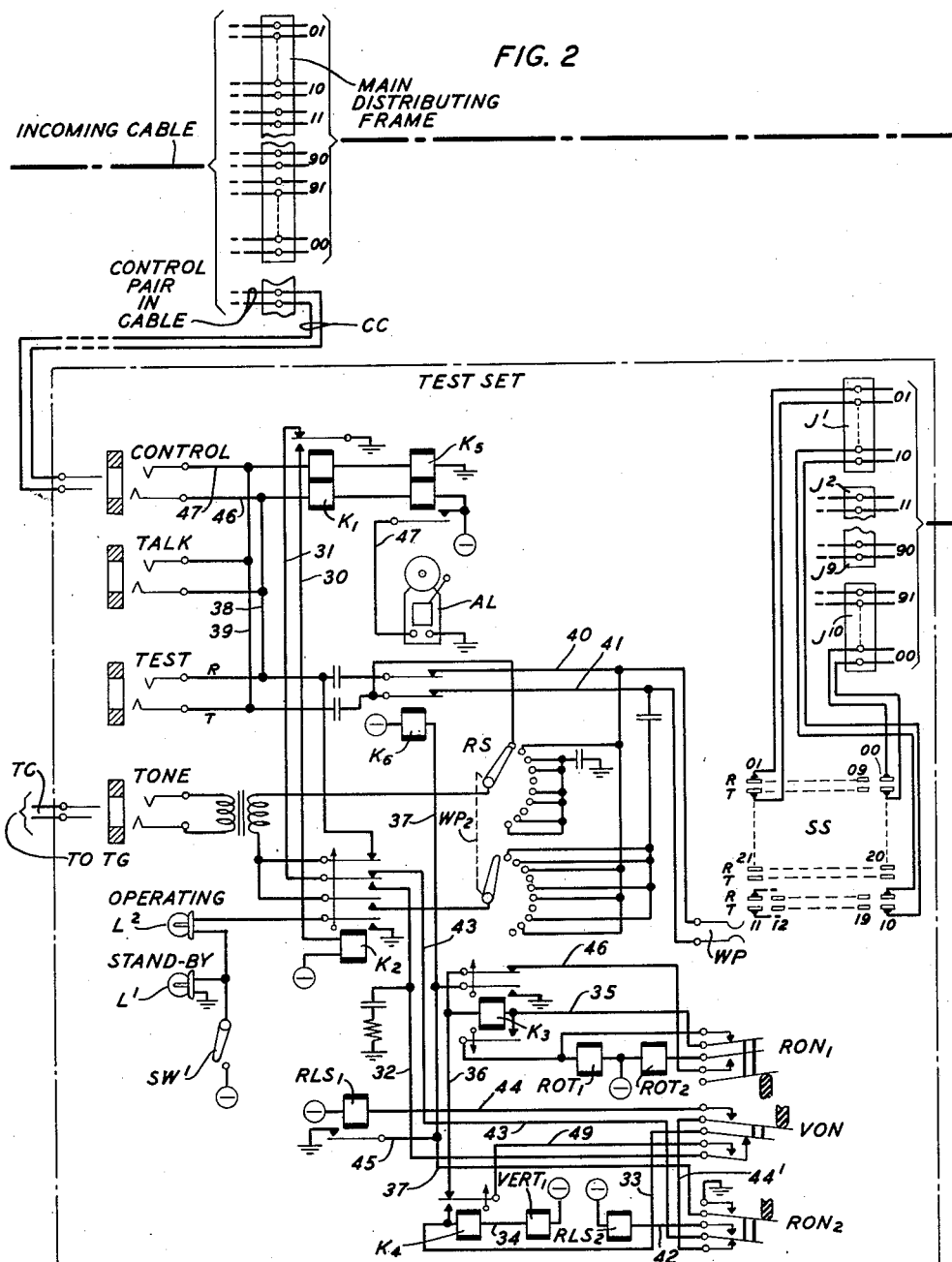
Fig. 2 is a schematic circuit drawing of the equipment located at the central office.

In the various figures and with particular reference to Fig. 1, there are disclosed the components which, when associated and connected together, as shown, will permit a single person at the remote point RP, which may be any distance from the central office, to automatically dial over the conductors 10 and 11 which are connected to the control pair CP, a given pair number by means of the set D. This set comprises a conventional calling dial and connections thereto for transmitting electrical impulses. The combination provides for automatic application of tone to the particular pair dialed so that the pair may be identified at the remote point by exploring between the conductor pairs of the cable C with the probe P. The probe P is connected to the set D through an amplifier AM, of well known construction, over the conductors 12 and 13 and from the set D over the cord 14 to the receiver R. The equipment thus far described is all located at a point remote from the central office and is intended to be operated by a single person at the remote point.

Figure 4:
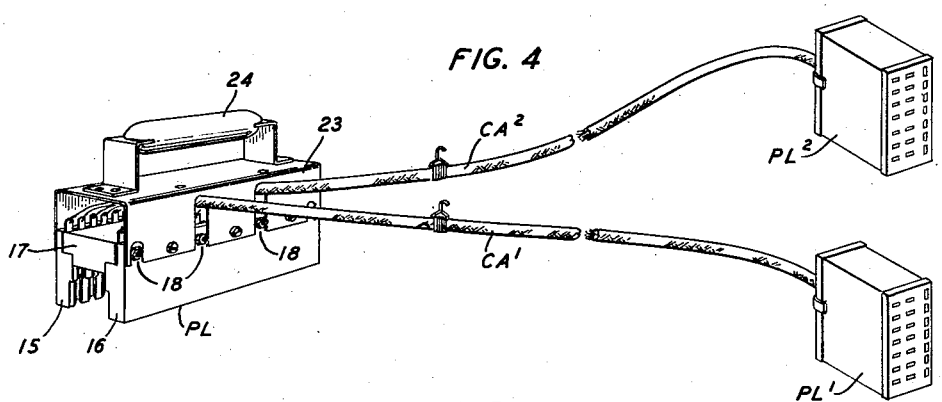
Fig. 4 is a view in perspective of a 20 pair plug arranged to be connected to the main frame and a pair of 10 pair plugs connected thereto by means of a pair of cables, each having 10 pairs of conductors as shown in Fig. 1.
Figure 5:
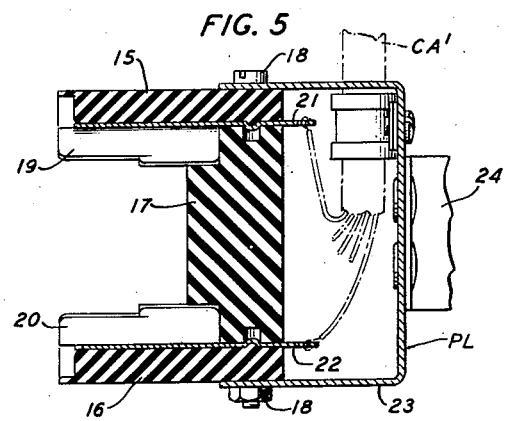
Fig. 5 is a cross-sectional view of the 20 pair plug taken on the line 5—5 of Fig. 6.
Figure 6:
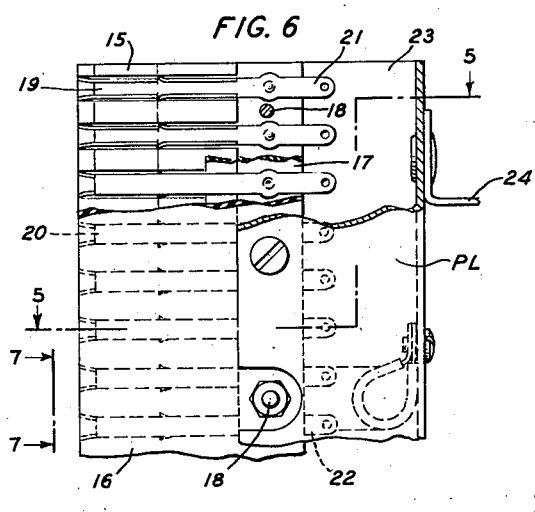
Fig. 6 is a fragmentary side elevational view of the 20 pair plug with portions broken away.

The equipment located at the central office, as shown, comprises a 20 pair plug PL, shown in Fig. 4, and more in detail in the fragmentary views 5 to 9, inclusive. The plug comprises a body member composed of two spaced apart, parallel, insulating members 15 and 16, having interposed between their upper stepped portions a longitudinally extending insulating member 17 for maintaining the members 15 and 16 in spaced relation. Suitable bolts 18 pass through the assembly to secure the parts together and to hold the contact springs 19 and 20 in place in their respective grooves on the inner surfaces of members 15 and 16 to maintain them in definite spaced relation. The ends of the contact springs 19 and 20 are gripped between and extend beyond the surface of the insulating members 15, 16 and 17 to provide lugs 21 and 22 to secure the ends of the conductors of the cable $CA^1$ thereto, as shown in Figs. 4 and 5.

In order to facilitate the handling of the plug PL and for protective purposes, a metal cover 23, having a handle 24 thereon, is provided.

Plug PL is intended to be connected to and establish electrical contact with the protectors PR, as shown in Figs. 8 and 9, on the main distributing frame DF, a well known structure. Connected to the plug PL are a pair of cables $CA^1$ and $CA^2$, each cable comprising 10 pairs of conductors which in turn are connected to the 10 pair plugs $PL^1$ and $PL^2$ which are of a well known type and arranged to be plugged into their respective jacks $J^1$ and $J^2$ on the panel PA of the apparatus cabinet CB, thereby connecting 20 pairs of conductors in the cable C to 20 pairs of connections in the apparatus cabinet CB.

The number of 20 pair plugs used will depend upon the number of conductor pairs in the cable. It is therefore obvious that with a sufficient number of plugs, the equipment shown in suitable for use with a cable having up to 100 conductor pairs.

Figure 3:
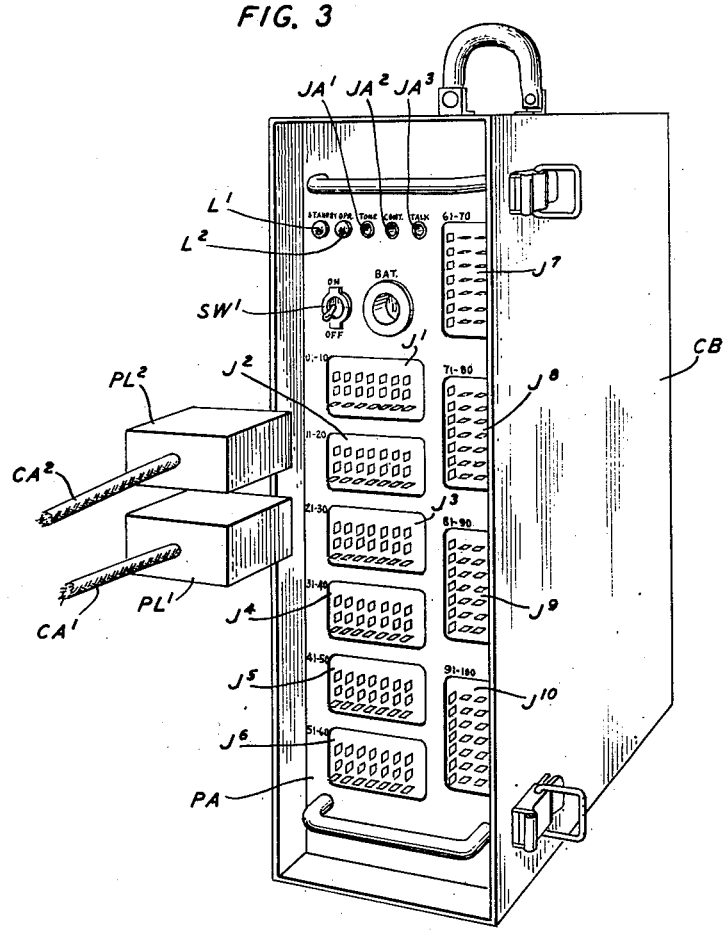
Fig. 3 is a view in perspective of the apparatus cabinet which houses the components shown in Fig. 2, with the connecting plugs removed from their corresponding jacks.

A control pair CP, which must be a good non-working conductor pair, is used for controlling the operation of the equipment in the housing or cabinet CB, shown in Fig. 3. This cabinet houses the necessary selector switches, relays and associated apparatus for automatically selecting the proper conductor pairs in accordance with the impulses transmitted over the control pair by the calling dial CD on the set D, and will be described in detail in connection with the description of the operation of our invention.

As shown in Fig. 3, the front panel PA is provided with a control switch $SW^1$, indicating lamps $L^1$ and $L^2$, and jacks $JA^1$, $JA^2$ and $JA^3$ for establishing the necessary outside connections thereto as shown in Fig. 1. The panel has also mounted thereon a plurality of multi-contact jacks J. These jacks each accommodate 10 conductor pair connections, i. e., the jack $J^1$ takes care of pairs 01 to 10, jack $J^2$ takes care of pairs 11 to 20, and so on. For the purpose of illustration we have shown 10 jacks $J^1$ to $J^{10}$, inclusive, of 10 pairs each which will take care of 100 conductor pairs. However, it is to be understood that we are not limited to this number as it may be increased or decreased, depending upon the requirements.

The control pair CP is readily picked up and identified by the tone method and connected to its respective terminals on the main frame over the control cable CC, which is plugged into its respective jack $JA^2$ on the panel of the apparatus cabinet CB.

A tone generator TG, which is automatically operated as heretofore referred to and which will hereinafter be described in detail is also connected to the cabinet CB by means of a plug on the end of the tone cable TC inserted in the jack $J^1$.

Eneregy for the operation of the equipment in the control cabinet CB is supplied by the battery BT over the cable PC which is connected to the receptacle labeled "BAT."

In the utilization of our heretofore described apparatus for identifying conductor pairs in a multi-conductor cable at a remote point, the following procedure is followed: While our invention has been disclosed with respect to its use with 100 pair cable, we are not limited to this precise size of cable as it is obvious that the capacity of the apparatus may be increased by the addition of components. For the sake of clarity we have disclosed only a pair of 10 pair plugs $PL^1$ and $PL^2$ associated with the panel PA on the apparatus cabinet CB and a single 20 pair plug PL at the main frame of the central office since the operation and structure of additional plugs are the same.

After the apparatus cabinet CB has been placed in the central office in a convenient location adjacent the main distributing frame and connections between the various components have been made as shown in Fig. 1 (central office), the actuation of the switch $SW^1$ on the panel PA to its "on" position will supply power to the equipment and its operation may be checked by observing whether or not the lamp $L^1$, which is labeled "Standby" is burning. The tone switch $SW^2$ on the tone generator TG is then operated which applies tone to the control pair CP which may be checked by touching the test clips of a head receiver to the test clips on the ends of the control cord CC where they are attached to the main distributing frame DF.

After the above operation has been completed, at a remote point on the cable CA where a splice or termination is to be made, the set D with its associated dial CD is supported from the strand as shown in Fig. 1 and the ground terminal thereof is connected to the sheath of the cable. After the necessary connections are made from the head receiver R to the set D and to the components associated therewith, the control pair CP, having tone impressed thereon, is located by using the probe P which is connected through the amplifier AM to the set D and thence to the head receiver R. After the control pair CP has been located, the conductor pairs 10 and 11 on the set D are connected thereto. After the components at the remote point have all been connected as shown, the switch SW on the set D is turned to its "Dial" position and the equipment is ready for the dialing of the number of a desired conductor pair.

Upon the dialing of the conductor pair number, the apparatus in the cabinet CB will bridge onto this pair. In the event that the pair is busy, which can be readily determined in the usual way, another pair should be dialed. If the dialed pair is not busy, dial one digit. This will place tone across the pair and the pair may now be located by means of the probe P and the head receiver R. After the desired pair has been located, the tip and ring sides are determined as follows. Dial one digit to place tone on the tip side. After the tip side has been identified, place tone on the ring side by dialing the digit "1." In the event that there is some doubt as to which are the tip and ring sides, dial one digit; this will remove tone from the pair. Then dial one digit to place the tone on the tip side and then one again to place tone on the ring side.

After the pair and its sides have been identified, the switch SW is now turned to its "release" position. Other pairs in the cable are identified by repeating the above procedure.

With reference to the circuit diagram shown in Fig.

2, the circuit and the operation described above may be traced as follows.

When a digit is dialed at the set D, at a remote point, the dial which is normally a short, alternately opens and shorts the control pair, thereby causing relay $K_1$ to open and close. Relay $K_2$, which was caused to operate through the back contact of relay $K_1$ over the conductor 30 as soon as the control pair was initially shorted, is a slow release relay and does not follow the dialing pulses from relay $K_1$ but remains operated until the splicer "hangs up." Hence ground is applied on the first pulse to the vertical magnet VERT from the back contact of relay $K_1$, over conductor 31, through the back contact on relay $K_2$, over conductor 32 through the vertical off normal spring VON, over the conductor 33 through the winding of relay $K_4$, over conductor 34 to the winding of vertical relay VERT, thereby causing relay $K_4$ to operate and cause the stepping switch SS to step vertically. Since the relay $K_4$ is a slow release relay, it remains operated during the operation of the first pulse train.

The vertical off-normal springs VON are mechanically operated on the first vertical step of the switch shaft; thereafter ground is applied on any subsequent pulse of the first digit to the vertical magnet VERT, through a contact on relay $K_1$, a contact on relay $K_2$, vertical off-normal springs, contacts of the relay $K_4$ and through the winding of relay $K_4$ to the vertical magnet VERT.

After the first pulse train has been completed, relay $K_4$ is de-energized and does not operate again. The first pulse of the next digit causes ground to be applied to relay $K_3$ and to the rotary magnet $ROT_1$, through the rotary off-normal springs $RON_1$, over conductor 35 to the winding of relay $K_3$, causing it to operate over conductor 36 to the front contact of relay $K_4$ and the path previously established through the vertical off-normal springs and the contacts of relays $K_1$ and $K_2$.

The rotary off-normal springs operate mechanically on the first rotary step and any subsequent pulses of the second digit are applied to the rotary magnet $ROT_1$ through the winding and contacts of relay $K_3$.

The operation of relay $K_3$ causes ground to be applied to relay $K_6$ through the back contact of relay $K_3$ over conductor 37 to the winding of relay $K_6$. Upon the operation of relay $K_6$, the normally closed front contacts will open and disconnect the control pair 38 and 39 from the wiper leads 40 and 41, thereby preventing noise from appearing on a busy line as the wiper WP moves across the bank of the stepping switch SS. Relay $K_3$ is also a slow release relay and remains operated for the duration of the second pulse train.

After the second pulse train is completed, relay $K_3$ releases, and does not operate again, this releases relay $K_6$, thus bridging the control pair 38 and 39 across the selected pair through capacitors CP—CP for monitoring purposes. The rotary selector switch RS operates on the pulses of the third and any subsequent digit and ground is applied to the winding of the rotary selector magnet $ROT_2$ for the operation thereof and the circuit may be traced as follows: From one side of the magnet $ROT_2$ through $RON_1$, over conductor 48, through the contacts on $K_3$, over 36, through contacts on $K_4$, over 49, through $VON_1$, over 32, through contacts $K_2$, over 30, through contacts $K_1$ to ground, thereby causing the rotary selector switch RS to operate.

The operation mechanically of the $RON_2$ springs applies ground to the winding of relay $K_6$ to energize it and thereby remove the control pair 38 and 39 from the selector bank wiper WP. This circuit may be traced as follows: From ground through the springs $RON_2$ over conductor 37 to relay $K_6$, otherwise the control pair 38 and 39 would be in parallel with the selected pair and tone on the selected pair would also appear on the control pair as well. It will be observed that when the third digit is "1," tone will be applied between the tip and ring; when it is "2," "5" or "8" it will be applied between tip and ground; when it is "3," "6" or "9" it will be applied between ring and ground, and when it is "4," "7" or "10" no tone will be applied.

The rotary selector RS will advance on every digit dialed after the pair is selected, i. e., if the workman has applied tone across the pair by dialing "1" as the third digit, he can apply tone between tip and ground by dialing "1" again and between ring and ground by dialing "1" a third time. He is able to switch tone between tip and ring three times if necessary without "hanging up" and redialing the pair. The positions with no tone on them will serve as an index. Thus, if the splicer needs to check whether his tone is on tip or ring, he dials "1" repeatedly until the tone disappears; he then knows if he dials "1" again, tone will appear on the tip.

When the control pair is opened, for example by placing the switch SW, on the set D, in its release position, relays $K_1$ and $K_2$ release, ground is applied to selector release magnet $RLS_2$ over conductor 42, through the contacts of the rotary off-normal springs $RON_2$, over conductor 43, through a front contact on relay $K_2$, over conductor 31, through front contact on relay $K_1$, thence to ground. This causes the release magnet $RLS_2$ to operate and restore the rotary selector switch RS and its off-normal springs $RON_2$ to normal. Ground is then applied to the stepping switch release magnet $RLS_1$ over the conductor 44, through the contacts on the vertical off-normal springs $VON_1$ over conductors $44^1$, through the contacts on the rotary off-normal springs $RON_2$, over conductor 43 to a front contact on relay $K_2$, over conductor 31 through front contact on relay $K_1$ to ground, thereby causing the stepping switch SS to release and restore the rotary off-normal springs $RON_1$ to normal. Ground is then applied to relay $K_6$ through the contacts on relay $RLS_1$, over conductors 45 and 37, thereby holding relay $K_6$ in its operated position to prevent noise being heard on a busy line as the bank wiper restores to normal. The release of the stepping switch SS is applied until the rotary selector RS wiper $WP_2$ is off its bank for the same reason. When the vertical off-normal springs $VON_1$ and the rotary off-normal springs $RON_2$ restore to normal, ground is removed from the selector release magnets, relay $K_2$ then releases due to the release of relay $K_1$ since control pair is no longer shorted, thus completing the cycle of operation.

When the splicer at the remote point desires to call the central office, he connects both sides of the control pair together and grounds it in the cable CA which is connected through the control cable CC to the conductors 46 and 47, by means of the jack connection labeled "Control" by connecting his talking set to the set D. This action shorts one winding of the relay $K_1$ and one winding of the relay $K_1$ and one winding of the relay $K_5$; thus, relay $K_1$ cannot be operated since both windings must be energized. However, relay $K_5$ will operate since the flux produced in one winding no longer cancels the flux produced in the other. Upon the operation of relay $K_5$, the contacts thereof close the circuit over conductor 47 to the alarm bell AL, causing it to be operated. Upon the operation of the alarm AL, a person at the central office plugs his telephone set into the jack labeled "Talk" and answers the splicer's call.

As shown, a test jack labeled "Talk" is provided for testing purposes. This jack is connected through tip and ring conductors T and R, through front contacts on the relay $K_6$, over conductors 40 and 41 to the rotary switches RS to the wiper WP and are bridged across control conductors 46 and 47.

While we have shown and described the preferred embodiment of our invention, it is to be understood that various changes and modifications may be made therein without departing from the spirit of the invention and it is not our intention to be restricted to any particular number of conductor pairs or groups. Neither is it our intention to be restricted to working or non-working pairs of conductors since the invention as disclosed may be used on either working or non-working conductor pairs with equal success. It is obvious that with our method and means for identifying conductor pairs in a multi-conductor cable, we can identify individual conductor pairs irrespective of the number of pairs or pair groups in the cable.

What is claimed is:

1. Apparatus for identifying conductor pairs in a multi-conductor cable, the ends of which are remotely spaced from each other, comprising a conductor pair selector mechanism, a source of power connected to said mechanism for the operation thereof, means connecting said mechanism to a non-working control pair of conductors in said cable at one end thereof, means connected to said control pair of conductors at the remote end of the cable over which the operation of said mechanism is controlled, means at the other end of the cable for connecting a plurality of conductor pairs in the cable to said selector mechanism, an impulse transmitting mechanism connected to the remote end of said cable for transmitting electrical impulses over said control pair of conductors to said selector mechanism for establishing an electrical connection with a conductor pair in said cable, a signal source for applying tone to the selected conductor pair, under the control of said selector mechanism, and means at the remote end of the cable, including amplifying means connected to said impulse transmitting mechanism, for exploring the conductor pairs, detecting an audible tone impressed upon a particular conductor pair for the identification thereof.

2. Apparatus for identifying conductor pairs in a multi-conductor cable, the ends of which are remotely spaced from each other, comprising a conductor pair selector mechanism, a source of power directly connected to said selector for the operation thereof, means connecting said selector mechanism to a non-working control pair of conductors in said cable at one end thereof, means connected to said control pair of conductors at the remote end of the cable over which the operation of said selector mechanism is controlled, a cord set having a plurality of multi-conductor connecting plugs on one end thereof and a single multi-conductor plug at the other end, for connecting a plurality of conductor pairs in the cable to said selector mechanism, an impulse transmitting mechanism connected to the remote end of said cable for transmitting electrical impulses over said control pair of conductors to said selector mechanism for establishing an electrical connection with a conductor pair in said cable, a signal source for applying tone to the selector conductor pair, under the control of said selector mechanism, any means at the remote end of the cable, including amplifying means, connected to said impulse ttransmitting mechanism, for exploring the conductor pairs for detecting an audible tone impressed upon a particular conductor pair for the identification thereof.

3. Apparatus for identifying conductor pairs in a multi-conductor cable, the ends of which are remotely spaced from each other, comprising a conductor pair selector mechanism, a source of power directly connected to said selector for the operation thereof, means connecting said selector mechanism to a non-working control pair of conductors in said cable at one end thereof, means connected to said control pair of conductors at the remote end of the cable over which the operation of said selector mechanism is controlled, means at the other end of the cable for connecting a plurality of conductor pairs in the cable to said selector mechanism, a dialing device at the remote end of said cable for transmitting electrical impulses over said control pair of conductors to said selector mechanism for establishing an electrical connection with a conductor pair in said cable, a signal source for applying tone to the selected conductor pair, under the control of said selector mechanism, and means at the remote end of the cable, including amplifying means connected to said dialing device, for exploring the conductor pairs, detecting an audible tone impressed upon a particular conductor pair for the identification thereof.

4. Apparatus for identifying conductor pairs in a multi-conductor cable, the ends of which are remotely spaced from each other, comprising a conductor pair selector mechanism, a source of power directly connected to said selector for the operation thereof, means connecting said selector mechanism to a non-working control pair of conductors in said cable at one end thereof, means connected to said control pair of conductors at the remote end of the cable over which the operation of said selector mechanism is controlled, a cord set having a plurality of multi-conductor connecting plugs on one end and a single multi-conductor plug at the other end, for connecting a plurality of conductor pairs in the cable to said selector mechanism, a dialing device at the remote end of said cable for transmitting electrical impulses over said control pair of conductors to said selector mechanism for establishing an electrical connection with a conductor pair in said cable, a signal source for applying tone to the selected conductor pair, under the control of said selector mechanism, and means at the remote end of the cable, including amplifying means, connected to said dialing device, for exploring the conductor pairs, picking up and observing an audible tone impressed upon a particular conductor pair for the identification thereof.

5. Apparatus for identifying conductor pairs in a multi-conductor cable, the ends of which are remotely spaced from each other, comprising a conductor pair selector mechanism, a source of electrical energy directly connected to said selector for the operation thereof, means connecting said selector mechanism to a non-working control pair of conductors in said cable at one end thereof, means connected to said control pair of conductors at the remote end of the cable over which the operation of said selector mechanism is controlled, means at the other end of the cable for connecting a plurality of conductor pairs in the cable to said selector mechanism, an impulse transmitting mechanism, connected to the remote end of said cable for transmitting electrical impulses over said control pair of conductors to said selector mechanism for establishing an electrical connection with a conductor pair in said cable, a signal source connected to said selector for applying tone to the selected conductor pair and under the control of said selector mechanism, and means at the remote end of the cable, including amplifying means connected to said impulse transmitting mechanism, for exploring the conductor pairs, picking up and observing an audible tone impressed upon a particular conductor pair for the identification thereof.

6. Apparatus for identifying conductor pairs in a multi-conductor cable, the ends of which are remotely spaced from each other, comprising a conductor pair selector mechanism, a source of electrical energy directly connected to said selector for the operation thereof, means connecting said selector mechanism to a non-working control pair of conductors in said cable at one end thereof, means connected to said control pair of conductors at the remote end of the cable over which the operation of said selector mechanism is controlled, a cord set having a plurality of multi-conductor connecting plugs at the selector end and a single multi-conductor plug at the other end, for connecting a plurality of conductor pairs in the cable to said selector mechanism, means connected to the remote end of said cable for transmitting electrical impulses over said control pair of conductors to said selector mechanism for establishing an electrical connection with a conductor pair in said cable, a signal source connected to said selector for applying tone to the selected conductor pair, and under the control of said selector mechanism, and means at the remote end of the cable for exploring the conductor pairs, picking up and observing an audible tone impressed upon a particular conductor pair for the identification thereof.

7. Apparatus for identifying conductor pairs in a multi-conductor cable, the ends of which are remotely spaced from each other, comprising a conductor pair selector mechanism, a source of electrical energy directly connected to said selector for the operation thereof, means connecting said selector mechanism to a non-working control pair of conductors in said cable at one end thereof, means connected to said control pair of conductors at the remote end of the cable over which the operation of said selector mechanism is controlled, means at the other end of the cable for connecting a plurality of conductor pairs in the cable to said selector mechanism, a dialing device at the remote end of said cable for transmitting electrical impulses over said control pair of conductors to said selector mechanism for establishing an electrical connection with a conductor pair in said cable, a signal source connected to said selector for applying tone to the selected conductor pair, and under the control of said selector mechanism, and means at the remote end of the cable, including amplifying means, connected to said dialing device, for exploring the conductor pairs, picking up and observing an audible tone impressed upon a particular conductor pair for the identification thereof.

8. Apparatus for identifying conductor pairs in a multi-conductor cable, the ends of which are remotely spaced from each other, comprising a conductor pair selector mechanism, a source of electrical energy directly connected to said selector for the operation thereof, means connecting said selector mechanism to a non-working control pair of conductors in said cable at one end thereof, means connected to said control pair of conductors at the remote end of the cable over which the operation of said selector mechanism is controlled, a cord set having multi-conductor connecting plugs on each end thereof at the other end of the cable for connecting a plurality of conductor pairs in the cable to said selector mechanism, a dialing device at the remote end of said cable for automatically transmitting electrical impulses over said control pair of conductors to said selector mechanism for establishing an electrical connection with a conductor pair in said cable, a signal source connected to said selector for applying tone to the selected conductor pair, and under the control of said selector mechanism, means at the remote end of the cable for exploring the conductor pairs for picking up and observing an audible tone impressed upon a particular conductor pair for the identification thereof, and means included in the electrical circuit of said selector mechanism for preventing noise appearing on a busy line, as said selector mechanism operates to locate a conductor pair.

9. Apparatus for identifying conductor pairs in a multi-conductor cable, the ends of which are remotely spaced from each other, comprising a conductor pair selector mechanism, means connecting said selector mechanism to a non-working control pair of conductors in said cable at one end thereof, means connected to said control pair of conductors at the remote end of the cable over which the operation of said selector mechanism is controlled, means at the other end of the cable for connecting a plurality of conductor pairs in the cable to said selector mechanism, means connected to the remote end of said cable for transmitting electrical impulses over said control pair of conductors to said selector mechanism for establishing an electrical connection with a tip and ring conductor pair in said cable, a signal source for applying tone to the selected conductor pair, under the control of said selector mechanism, a probe at the remote end of the cable in circuit with an amplifier and connected to said impulse transmitting means, a head receiver also connected to said impulse transmitter for picking up and observing an audible tone impressed upon the tip and ring of a particular conductor pair for the identification thereof, and means for applying tone between the tip and ring conductors when certain digits are dialed, between tip and ground when a different set of digits are dialed and between ring and ground when still another set of digits are dialed.

10. Apparatus for identifying conductor pairs in a multi-conductor cable, the ends of which are remotely spaced from each other, comprising a conductor pair selector mechanism at the central office, means connecting said selector mechanism to a non-working control pair of conductors in said cable at one end thereof, means connected to said control pair of conductors at the remote end of the cable over which the operation of said selector mechanism is controlled, a cord set having multi-conductor connecting plugs on each end thereof at the central office end of the cable for connecting a plurality of conductor pairs in the cable to said selector mechanism, means connected to the remote end of said cable for transmitting electrical impulses over said control pair of conductors to said selector mechanism for establishing an electrical connection with a conductor pair in said cable, a signal source for applying tone to the selected conductor pair, under the control of said selector mechanism, a probe at the remote end of the cable in circuit with an amplifier and connected to said impulse transmitting means, a head receiver also connected to said impulse transmitter for picking up and observing an audible tone impressed upon a particular conductor pair for the identification thereof, and means at the remote location for signaling the central office and establishing a talking connection therewith.

No references cited.